(12) United States Patent
Yamaguchi et al.

(10) Patent No.: US 7,782,333 B2
(45) Date of Patent: Aug. 24, 2010

(54) SCREEN TRANSMISSION DEVICE, METHOD OF GENERATING SCREEN AND COMPUTER READABLE MEDIUM

(75) Inventors: Shogo Yamaguchi, Kawasaki (JP); Shinya Murai, Kawasaki (JP); Kotaro Ise, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 539 days.

(21) Appl. No.: 11/699,571

(22) Filed: Jan. 30, 2007

(65) Prior Publication Data

US 2007/0188429 A1 Aug. 16, 2007

(30) Foreign Application Priority Data

Feb. 16, 2006 (JP) ............................. 2006-039602

(51) Int. Cl.
*G09G 3/30* (2006.01)
*G09G 5/00* (2006.01)
*G09G 3/36* (2006.01)
*G09G 5/10* (2006.01)
*H04N 5/57* (2006.01)
*G06F 1/26* (2006.01)
*G06F 1/00* (2006.01)
*H04N 9/31* (2006.01)
*G02F 1/13* (2006.01)

(52) U.S. Cl. ...................... 345/581; 345/102; 345/211; 345/690; 345/77; 349/1; 713/340; 713/320; 348/602; 348/761

(58) Field of Classification Search ................ 345/581, 345/426, 428, 589, 593, 597, 619, 690, 548–549, 345/207, 38–39, 46–50, 63, 77, 87, 88, 102, 345/211; 348/562–566, 602, 761; 715/700, 715/781; 349/1, 16, 61; 713/320, 300, 340
See application file for complete search history.

(56) References Cited

U.S. PATENT DOCUMENTS 5,894,580 A * 4/1999 Yoshida ...................... 713/340

(Continued)

FOREIGN PATENT DOCUMENTS

EP 1 538 591 6/2005

(Continued)

OTHER PUBLICATIONS

Office Action dated Jun. 6, 2008 in Chinese Application 2007100852459 and English-language translation.

(Continued)

*Primary Examiner*—Wesner Sajous
(74) *Attorney, Agent, or Firm*—Nixon & Vanderhye, PC

(57) ABSTRACT

According to an aspect of the present invention, there is provided with a screen transmission device including: an information receiver configured to receive operating condition information indicating an operating condition of a screen display device; a coloring determiner configured to determine coloring of screen data to be displayed on the screen display device based on the operating condition information; a screen data generator configured to generate screen data to be displayed on the screen display device according to the coloring; and a screen data transmitter configured to transmit the screen data to the screen display device.

4 Claims, 19 Drawing Sheets

U.S. PATENT DOCUMENTS

| | | | |
|---|---|---|---|
| 6,597,339 B1 * | 7/2003 | Ogawa | 345/102 |
| 6,798,395 B1 * | 9/2004 | Yamauchi et al. | 345/102 |
| 2002/0004911 A1 * | 1/2002 | Nakai | 713/300 |
| 2002/0145611 A1 * | 10/2002 | Dye et al. | 345/543 |
| 2003/0210221 A1 * | 11/2003 | Aleksic | 345/102 |
| 2004/0027364 A1 * | 2/2004 | Ohtani et al. | 345/699 |
| 2004/0104877 A1 * | 6/2004 | Kitagawa | 345/88 |
| 2004/0178973 A1 * | 9/2004 | Miller et al. | 345/82 |
| 2005/0057487 A1 * | 3/2005 | Takata et al. | 345/102 |
| 2005/0243051 A1 * | 11/2005 | Kudo et al. | 345/99 |
| 2006/0146003 A1 * | 7/2006 | Diefenbaugh et al. | 345/102 |
| 2007/0094519 A1 | 4/2007 | Yamamoto | |
| 2009/0085857 A1 * | 4/2009 | Kudo et al. | 345/98 |

FOREIGN PATENT DOCUMENTS

| | | |
|---|---|---|
| JP | 06-237477 | 8/1994 |
| JP | 2000-132152 | 5/2000 |
| JP | 2000-250455 | 9/2000 |
| JP | 2000-341222 | 12/2000 |
| JP | 2001-350619 | 12/2001 |
| JP | 2002-323942 | 11/2002 |
| WO | 2005/038638 | 4/2005 |

OTHER PUBLICATIONS

Japanese Office Action dated Oct. 20, 2009 in Japanese Application No. 2006039602 including English-language translation thereof.

Tamai et al.; "Low Power Video Streaming for PDAs"; Graduate School of Information Science at Nara Inst. of Science and Technology, Ikoma, Nara 630-0192, Oct. 8, 2003, XP-002571114.

Samanta et al.; "Impact of Video Encoding Parameters on Dynamic Video Transcoding"; University of California Los Angeles Computer Science Department; Jan. 12, 2006; XP-00257115.

Samanta, Vidyut; "A Study of Mobile Messaging Services"; University of California Los Angeles Computer Science Department; 2005; XP-002571116.

Search Report dated Mar. 18, 2010 in EP Application No. 07102065.5.

* cited by examiner

| INFORMATION TYPE (DISPLAY BRIGHTNESS) | LUMINANCE LEVEL |
|---|---|

FIG. 4

| INFORMATION TYPE (USER OPERATION) | POINTER POSITION | BUTTON OPERATION CONTENTS |
|---|---|---|

FIG. 5

| INFORMATION TYPE (BATTERY REMAINING AMOUNT) | BATTERY REMAINING AMOUNT |
|---|---|

FIG. 11

| INFORMATION TYPE (BRIGHTNESS SETTING) | LUMINANCE LEVEL | SETTING POSITION |
|---|---|---|

FIG. 12

| INFORMATION TYPE (OPERATION SETTING) | CPU OPERATING FERQUENCY | IMAGE CODEC (TYPE, OPERATING FREQUENCY) |

FIG. 14

| SCREEN ATTRIBUTE | REMAINING AMOUNT OF BATTERY | | | |
| --- | --- | --- | --- | --- |
| | ~80% | ~60% | ~30% | ~0% |
| POINTER | HIGH | HIGH | HIGH | MEDIUM |
| FOCUS WINDOW | HIGH | HIGH | MEDIUM | LOW |
| VIDEO WINDOW | HIGH | MEDIUM | LOW | LOW |
| MENU | HIGH | HIGH | HIGH | MEDIUM |
| SCROLLING | HIGH | MEDIUM | LOW | LOW |
| OTHERS | HIGH | MEDIUM | LOW | LOW |

FIG. 22

111: LIQUID CRYSTAL PANAL
112: BACKLIGHT UNIT

113: LIQUID CRYSTAL PANAL
114: BACKLIGHT UNIT

115: ORGANIC EL DISPLAY DEVICE

SCREEN TRANSMISSION DEVICE, METHOD OF GENERATING SCREEN AND COMPUTER READABLE MEDIUM

CROSS-REFERENCE TO RELATED APPLICATIONS

This application is based upon and claims the benefit of priority from the prior Japanese Patent Applications No. 2006-39602 filed on Feb. 16, 2006, the entire contents of which are incorporated herein by reference.

BACKGROUND OF THE INVENTION

1. Field of the Invention

The present invention relates to a screen transmission device which transmits a computer screen on a PC (Personal Computer) or the like through a network, a method of generating a screen and a computer readable medium.

2. Related Art

There is a system which is connected to a remote computer (hereinafter, referred to as a "remote device") via a network, receives a display image from the remote device and displays it, transmits information on key inputs or the like performed using a device at hand or the like to the remote device, and can thereby use the remote device as if it were at hand. For example, VNC (Virtual Network Computing) and a remote desktop or a smart display of Windows correspond to this. Such a system can be used to operate a PC which is in widely-spaced room in an office, operate an office PC from outside the office or operate a PC which is located in widely-spaced room in a house from a device at hand and so on.

The development of networks, and wireless networks in particular in recent years is remarkable and a mode of wirelessly connecting a device at hand in the above described system and thereby accessing a remote device from an arbitrary position is becoming generalized. However, in order to exploit to the full the merit of accessibility from an arbitrary position by means of wireless connection, use of a battery constitutes an effective means instead of obtaining a power supply from a wall outlet.

When using a battery, an operating time of the battery is one of important factors in determining usability. Simply increasing the battery capacity can expand the operating time, but it also increases the weight of the device carried around with it and increases inconvenience in carrying around the device. Expanding the continuous operating time without increasing the battery capacity requires power consumption of the device to be minimized.

Conventionally, various methods are proposed to lower power consumption. The simplest method may be darkening the display itself, but when using the device in a bright surrounding environment, there is a problem that darkening the display considerably degrades viewability. As another method, a smart display of Windows allows power to be automatically turned off when the display is not in use for a certain time so as to save the power of the battery. Furthermore, JP-A 2002-323942(KOKAI) proposes not only to automatically transition to a power saving mode when there is no operation for a certain time but also to automatically transition from the power saving mode to a normal mode when a specific application event occurs to thereby make user-friendliness compatible with power saving.

On the other hand, JP-A 2000-341222(KOKAI) describes a power saving method when a device is in operation. According to JP-A 2000-341222(KOKAI), video or coded data of voice is transmitted from a remote terminal to a terminal at hand and when the remaining amount of a battery of the terminal at hand decreases, the remote terminal is informed of the decrease in the remaining amount. Upon receiving the information, the remote terminal changes the coding mode to a power saving mode.

As described above, as the power saving method for a screen reception device, the method of automatically turning off power when the device is not in operation or transitioning to a power saving mode is proposed as in the case of the smart display of Windows and JP-A 2002-323942(KOKAI). However, such a method can realize power saving when the device is not in operation, but when the device is continuously used for a long time, there is a problem that power saving is not realized at all and it is not possible to expand a continuous operating time.

On the other hand, as a power saving method of a device is in operation, a method of changing a power-saving coding mode of an image according to the remaining amount of the battery of the image display terminal is proposed as in the case of JP-A 2000-341222(KOKAI). The "power-saving coding mode" described here refers to a mode of reducing the resolution of an image or reducing color gradation or sending only part of the center of the image. However, there is a problem that reducing the resolution of a computer screen causes characters to be crushed and become hardly legible and in this way, reducing the amount of information on the image itself not only causes the appearance to become poor but also degrades user-friendliness.

SUMMARY OF THE INVENTION

According to an aspect of the present invention, there is provided with a screen transmission device comprising:

an information receiver configured to receive operating condition information indicating an operating condition of a screen display device;

a coloring determiner configured to determine coloring of screen data to be displayed on the screen display device based on the operating condition information;

a screen data generator configured to generate screen data to be displayed on the screen display device according to the coloring; and a screen data transmitter configured to transmit the screen data to the screen display device.

According to an aspect of the present invention, there is provided with a screen generating method, comprising:

receiving operating condition information indicating an operating condition of a screen display device;

determining coloring of screen data to be displayed on the screen display device based on the operating condition information;

generating screen data to be displayed on the screen display device according to the coloring; and transmitting the screen data to the screen display device.

According to an aspect of the present invention, there is provided with computer readable medium storing a computer program for causing a computer to execute instructions, to perform steps of:

receiving operating condition information indicating an operating condition of a screen display device;

determining coloring of screen data to be displayed on the screen display device based on the operating condition information;

generating screen data to be displayed on the screen display device according to the coloring; and transmitting the screen data to the screen display device.

BRIEF DESCRIPTION OF THE DRAWINGS

FIG. 4 illustrates an example of a frame format of display luminance information according to the first embodiment;

FIG. 5 illustrates an example of a frame format of user operation event information according to the first embodiment;

FIG. 11 illustrates an example of a frame format of battery remaining amount information according to the third embodiment;

FIG. 12 illustrates an example of a frame format of luminance setting information according to the third embodiment;

FIG. 14 illustrates an example of a frame format of operation setting information according to a fourth embodiment;

FIG. 22 illustrates an example of a table of correspondence between screen attributes and transmission rates according to the seventh embodiment;

DETAILED DESCRIPTION OF THE INVENTION

First Embodiment

[Screen Display Device Informing Luminance]

Figure 1:
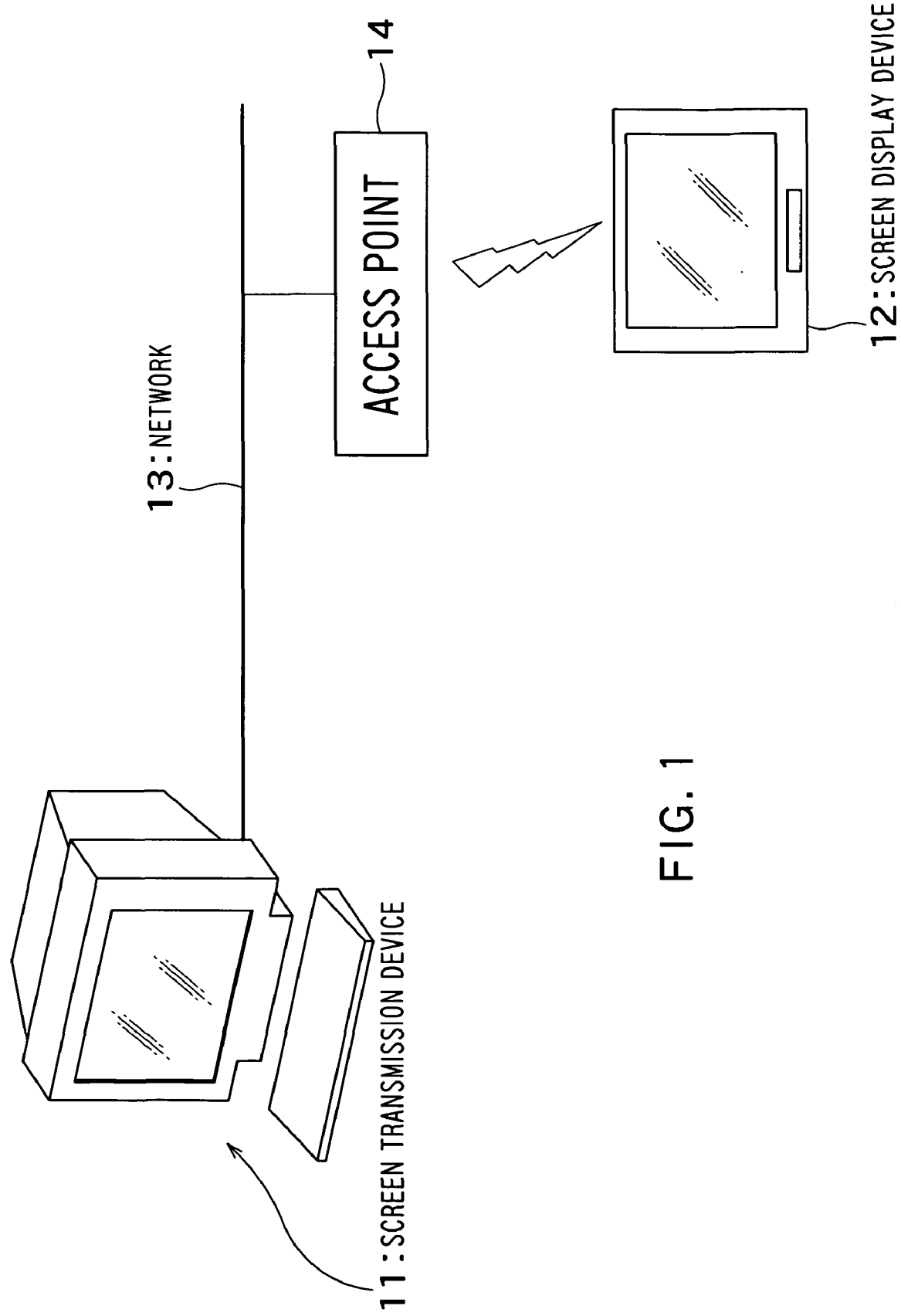
FIG. 1 illustrates an example of a screen transfer system according to a first embodiment.

FIG. 1 illustrates an example of a screen transfer system according to this embodiment. A screen transmission device 11 and a screen display device 12 are connected through a network 13. In the figure, the screen transmission device 11 is connected using a wire and the screen display device 12 is connected wirelessly to the network 13 through an access point 14 of a wireless LAN (Local Area Network). The connection mode is not limited to this and, for example, the screen transmission device may also be connected wirelessly through the access point or the screen transmission device and the screen display device may be directly connected wirelessly in an ad hoc mode of the wireless LAN. Furthermore, the figure shows that the screen transmission device and the screen display device are connected to the same network segment, but their connection is not limited to this and, for example, both devices may also be located geographically distant from each other via the Internet or intranet.

The screen transmission device 11 transmits screen data to the screen display device 12. On the other hand, the screen display device 12 receives and displays the screen data transmitted from the screen transmission device 11. Furthermore, the screen display device 12 receives inputs from the user and sends them to the screen transmission device 11 as user operation events. The screen transmission device 11 generates screen data which reflects the received user operation events and transmits it to the screen display device 12. Through the above described mechanism, the user can realize the operation of the screen transmission device 11 which is located in a distant place by operating the screen display device 12 at hand.

Figure 2:
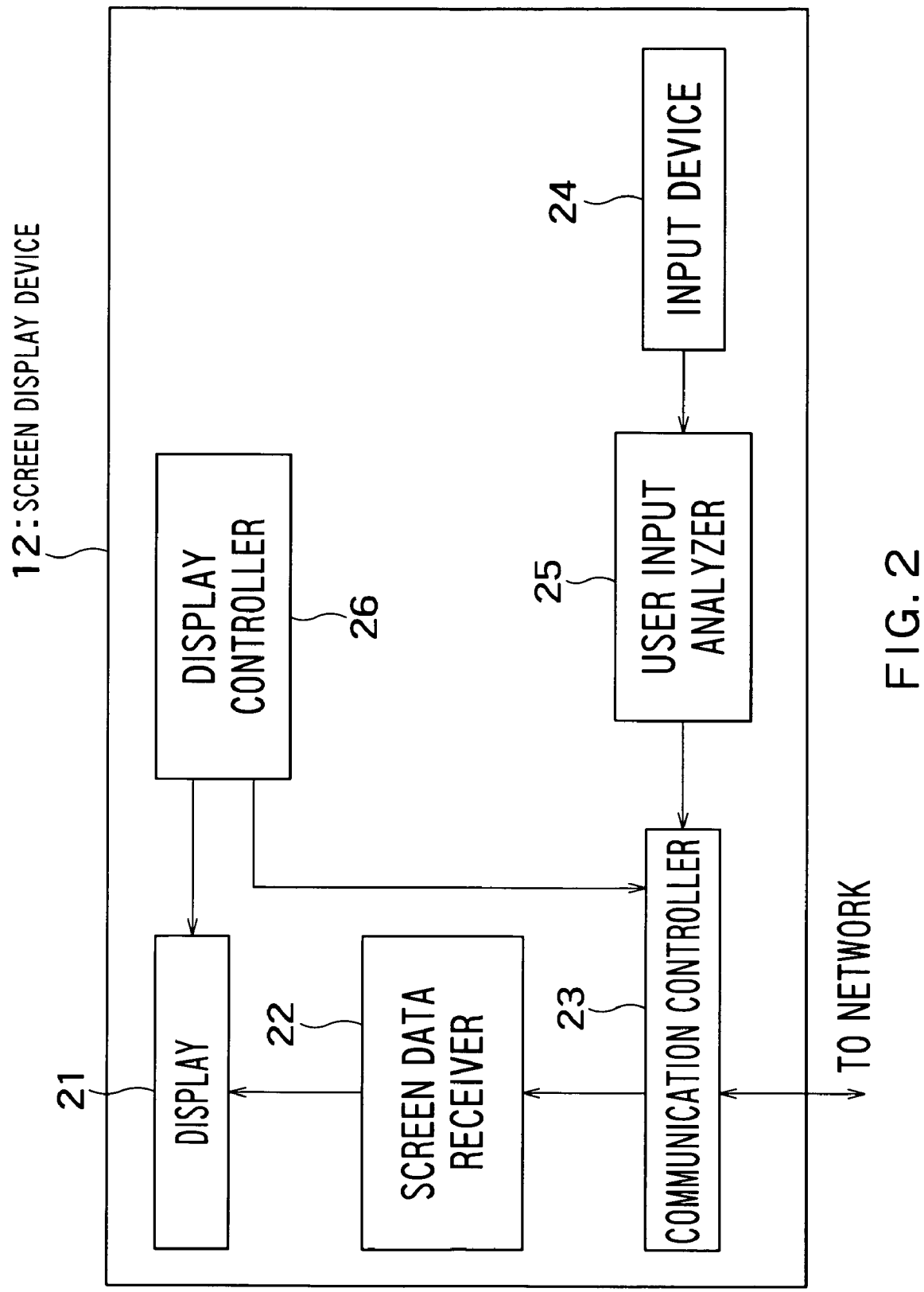
FIG. 2 illustrates an example of the block configuration of a screen display device according to the first embodiment.

FIG. 2 shows an example of the block configuration of the screen display device 12. The figure shows a display 21, a screen data receiver 22, a communication controller 23, an input device 24, a user input analyzer 25 and a display controller 26.

The display 21 displays a screen constructed by the screen data receiver 22. Examples of the display are shown in FIG. 23 to FIG. 25.

Figure 23:
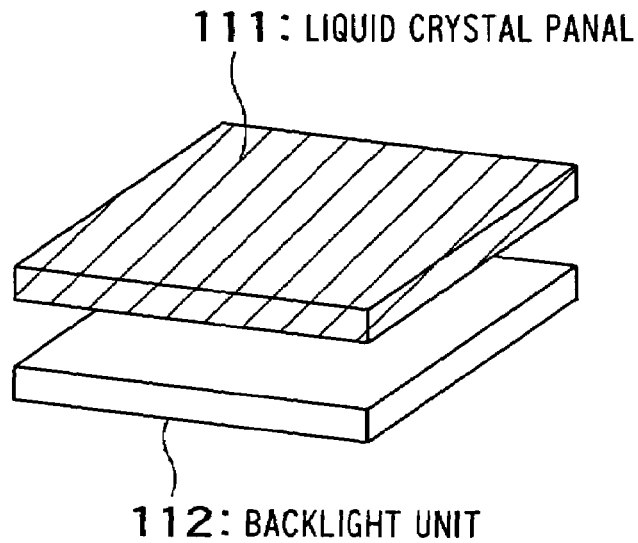
FIG. 23 schematically illustrates the configuration of a backlight type liquid crystal display device.

FIG. 23 schematically shows the configuration of a backlight type liquid crystal display (LCD) device. The figure shows a liquid crystal panel 111 which includes an effective display area and a backlight unit 112 which illuminates the liquid crystal panel 111. The color display of each pixel in the effective display area of the liquid crystal panel 111 is controlled using light irradiated from the backlight unit 112.

Figure 24:
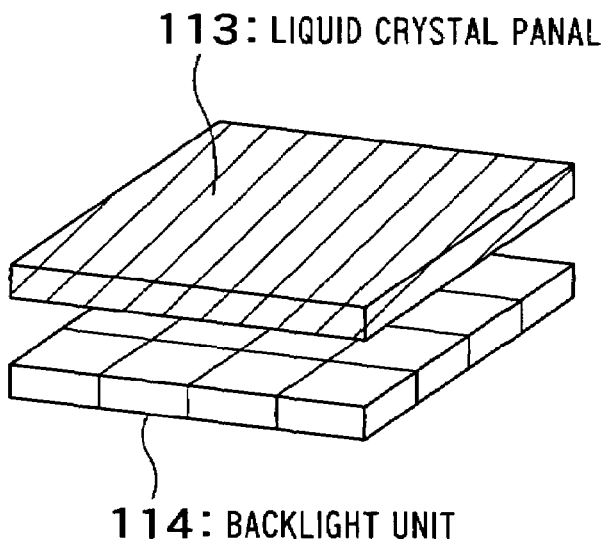
FIG. 24 schematically illustrates the configuration of a split backlight type liquid crystal display device.

FIG. 24 schematically shows the configuration of a split backlight type liquid crystal display device (liquid crystal display device having a plurality of split backlights). The figure shows a liquid crystal panel 113 which includes an effective display area and a backlight unit 114 which irradiates the liquid crystal panel 113. The backlight unit 114 is divided into a plurality of areas and capable of controlling light emissions (luminance) in the respective areas independently of each other. Each area of the backlight unit 114 may also be constructed using, for example, an LED (Light-Emitting Diode).

Figure 25:
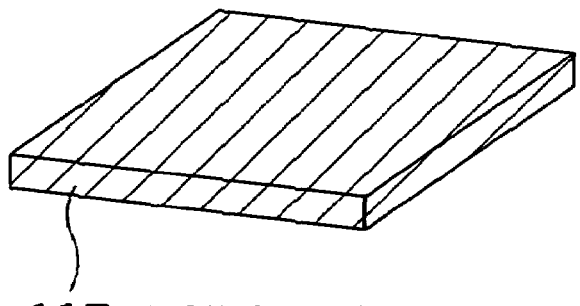
FIG. 25 schematically illustrates the configuration of a display device using self light emitting element as a display element.

FIG. 25 schematically shows the configuration of a display device using self light emitting elements as the display elements. Here, an organic EL display device 115 is shown as an example of the display device. The organic EL display device 115 has a plurality of organic EL elements which emit light corresponding to a drive current. Each organic EL element corresponds to one display element.

The communication controller 23 transmits data to a network and receives data from the network. Data is transmitted/received without excess or deficiency to/from the screen transmission device which becomes the destination device. The communication controller 23 must form a communication channel with the screen transmission device which becomes the destination device prior to data transmission/reception. TCP/IP is generally used as a communications protocol, but the communications protocol is not limited to this and any protocol may be used if it at least allows data to be transmitted/received. Furthermore, it is necessary to specify a screen transmission device which becomes the destination device, but the method of specification is not particularly limited either and the user may specify, for example, an IP address if TCP/IP is used or if there is an environment in which a DNS can be used, the user may specify a host name and the DNS may convert the host name to an IP address and then form a communication channel. Data to be transmitted includes a user operation event which is sent from the user input analyzer 25 and the user operation event is transmitted to the specified screen transmission device. Data to be received includes screen data transmitted from the screen transmission device. When the communication controller 23 receives screen data, it sends the received screen data to the screen data receiver 22.

The input device 24 is to perform user input and sends a signal corresponding to operation the user has performed to the user input analyzer 25. The type of the device is not particularly limited and it may be a mouse and touch panel, pen input, keyboard or a combination thereof or the like.

The user input analyzer 25 converts an input signal handed from the input device 24 to a user input event on a computer screen which is displayed on the display 21 and transfers it to the communication controller 23. Examples of input events include a movement of a pointer, Up/Down of the mouse right/left button, Up/Down a key or the like. The converted event is sent to the communication controller 23 to be transmitted to the screen transmission device.

The screen data receiver 22 processes the screen data sent from the communication controller 23. The screen data receiver 22 expands the received screen data if it is compressed and overwrites the screen data at an appropriate position of the frame buffer which stores the whole screen in the screen data receiver 22. The screen data which is stored in the frame buffer is sent to the display 21 and displayed.

The display controller 26 controls luminance of the display 21. As the method of controlling the luminance, a method that matches the type of the display may be used. For example, when the display is a liquid crystal display, it controls the luminance of the backlight. When the elements of the display itself emit light like an organic EL display, it controls the amount of light emission of the elements. The control timing is not particularly limited, but, for example, a method for the user to control it using some input means may be used. For example, a luminance control button may be prepared and the user can control luminance by pushing the button. Alternatively, it is possible to provide a user interface for luminance control by software, display a GUI for the control on the display and control the luminance through the user operation using the GUI. Furthermore, another method may be a method of controlling luminance according to the remaining amount of the battery of the device. There is also a method whereby means for detecting the remaining amount of the battery is provided and the luminance of the display is decreased when, for example, the remaining amount of the battery falls to or below a predetermined level. As the stages of luminance, it is possible to change luminance in not only two stages but also a plurality of stages. Information on the luminance of the display after the control is sent to the communication controller 23 to be transmitted to the screen transmission device.

Figure 3:
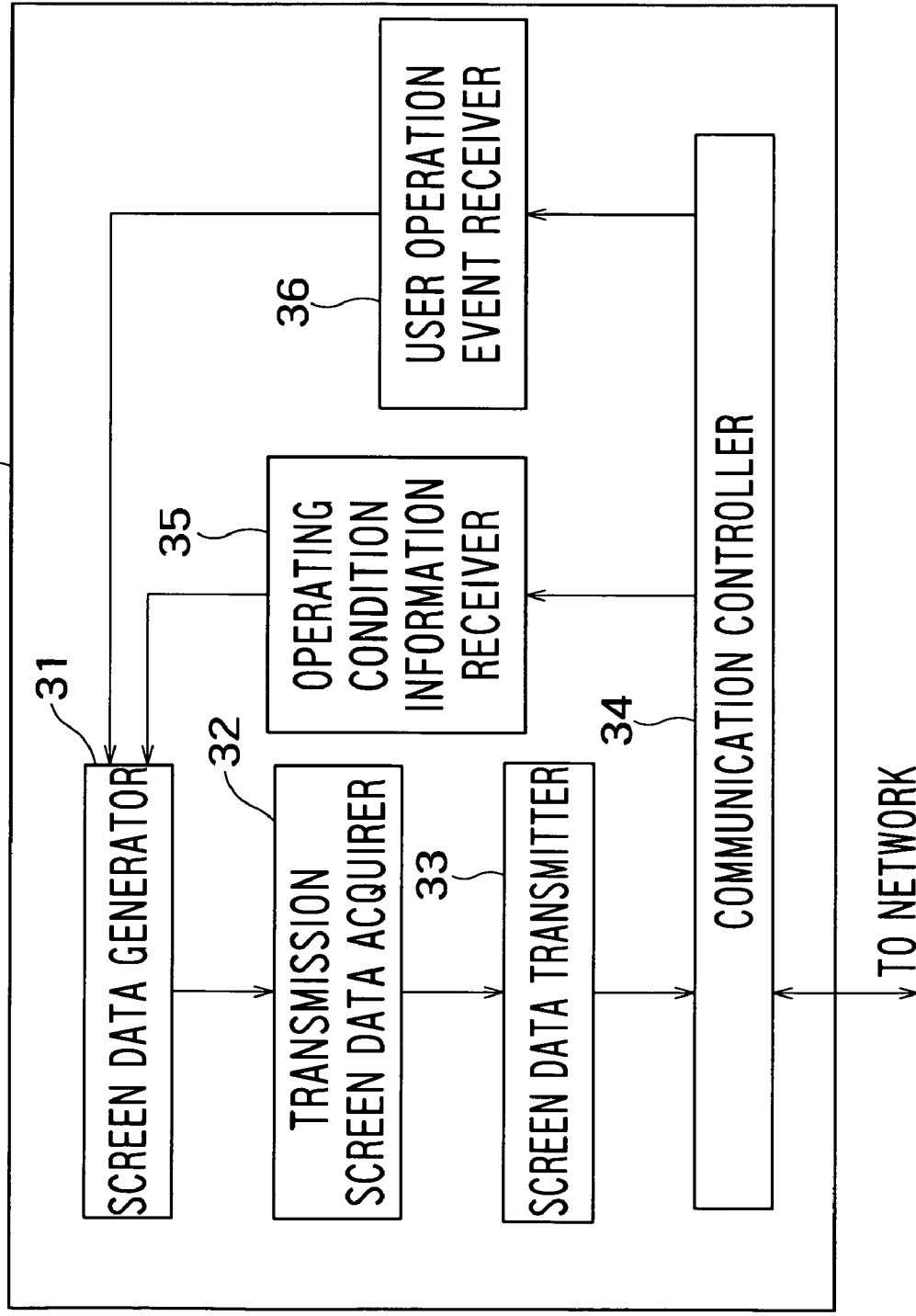
FIG. 3 illustrates an example of the block configuration of a screen transmission device according to the first embodiment.

FIG. 3 shows an example of the block configuration of the screen transmission device 11. The figure shows a screen data generator 31, a transmission screen data acquirer 32, a screen data transmitter 33, a communication controller 34, an operating condition information receiver 35 and a user operation event receiver 36. The screen data generator 31 includes coloring determiner. The operating condition information receiver 35 corresponds, for example, to information receiver.

The screen data generator 31 generates a so-called computer screen. A frame buffer having a size conforming to the resolution of the screen is generally provided to store the latest screen to be displayed. The screen itself is generated through cooperation among an application, OS (Operating System) and display driver or the like and an image generated is written into the frame buffer. If displayed on a display (not shown) of the own device, the contents of the written frame buffer are sent to the display. When the screen data generator 31 receives a user operation event from the user operation event receiver 36, it generates a screen according to the event type. For example, when the event is a pointer movement event, the pointer is redrawn on the destination screen.

The transmission screen data acquirer 32 acquires the position at which data is displayed and updated, and drawing data is acquired. As the acquisition method, it is also possible to receive all update information generated to be displayed and updated from the screen data generator 31 and use it as is. Alternatively, it is also possible to periodically acquire the latest screen from the screen data generator 31, compare it with the screen acquired last time and thereby extract the updated part. In addition, it is also possible to hook drawing type events such as screen updates used in the system, thereby monitor which part of the screen has been updated and acquire only drawing data of the updated part obtained from the frame buffer of the screen data generator 31. The acquired screen data is sent to the screen data transmitter 33.

The screen data transmitter 33 transmits the updated screen data which has been sent from the transmission screen data acquirer 32 to the screen display device. The update position of the screen and the drawing data are transmitted as a set of data. When the drawing data is not compressed, the data size is large, and therefore the data may be compressed first and then transmitted.

The communication controller 34 transmits data to the network and receives data from the network. Data is transmitted/received without excess or deficiency to/from the screen display device which becomes the destination device. Prior to a communication, the communication controller 34 receives a communication channel generating request from the screen display device and establishes a communication channel. The communication controller 34 transmits the data sent from the screen data transmitter 33 to a screen display device with which a communication channel has been established. Examples of data types received from the screen display device include a user operation event and operating condition information from the screen display device and they are sent to the user operation event receiver 36 and the operating condition information receiver 35 respectively.

The operating condition information receiver 35 receives luminance information of the display of the screen display device. The operating condition information receiver 35 sends the received luminance information to the screen data generator 31.

When the screen data generator 31 receives the luminance information of the display of the screen display device from the operating condition information receiver 35, it changes the coloring of the screen to be generated according to the received luminance information. The method of changing the coloring is not particularly limited but, for example, a method of changing coloring such that the contrast between the colors used increases may be used. One specific example of increasing the contrast can be a method of expanding the range of tone of pixels. When it is assumed that original tone of some pixel is Y-org, tone after coloring change is Y-new, maximum tone in the screen is Y-max and minimum tone is Y-min, Y-new can be calculated from:

$$Y\text{-new}=(Y\text{-org}-Y\text{-min})*(255/(Y\text{-max}-Y\text{-min}))$$

In this expression, the range of tone values Y-min to Y-max of the original image is converted to a range of 0 to 255, but it is also possible to control the range in a step-by-step manner by, for example, widening the range of tone of pixels as the luminance of the display of the screen display device decreases. Widening the range of tone of pixels is equivalent to widening the range of a voltage applied to the liquid crystal in a liquid crystal display device, for example. Contrast based on the tone of each pixel is used above, but it is also possible to use contrast based on chroma. When the screen display device is an element light emission type display device such as an organic EL display device, it is preferable to determine the coloring of the screen so as not to exceed whole power consumption of the luminance set on the display device side.

As another method of changing coloring, it is possible to use coloring in such a way that the difference in contrast between background colors and characters displayed thereon increases such as a window background and characters. Furthermore, instead of always changing the coloring of the whole screen, coloring may be determined for each window in the screen. For example, it is possible to change coloring of only an active window and keep coloring of non-active windows constant. The element light-emission type display device such as an organic EL display device makes an active window brighter and darkens other parts, and can thereby operate a specific window in a bright screen condition while keeping whole power consumption to a low level. In the case of the liquid crystal display device, there is an advantage that the processing load on the screen transmission device is small because it is necessary to change coloring of only the active window.

The user operation event receiver 36 extracts auxiliary data (coordinates of the destination of a cursor movement event or the like) according to the type of event such as movement of a pointer and Up/Down of a button from user operation event data transmitted from the screen display device and sends the extracted event to the screen data generator 31.

Next, information which is transmitted/received between the screen display device 12 and screen transmission device 11 will be explained. Examples of the information transmitted from the screen display device 12 to the screen transmission device 11 include luminance information of the display and a user operation event. FIGS. 4 and 5 show examples of the frame format used for information transmission. The information type is the information to distinguish whether data is display luminance information or user operation event information. In the case of the display luminance information, the current display luminance level of the screen display device is described. For the display luminance level, a value of cd/m2 (candela per square meter) which is the unit to express the luminance of a display may be used. Alternatively, it is also possible to set discrete levels beforehand, for example, level 1, level 2 and level 3 in the case of three stages, for example, and transmits the current luminance level as the luminance information. Alternatively, it is also possible to use the luminance when a connection is started as a reference and describe the degree of change from the reference. On the other hand, information on the pointer position (coordinates values) and button operation contents ("pressing of right button" or the like) is described as user operation event information.

An example of the flow of operations between the screen display device 12 and screen transmission device 11 will be described. When the screen display device 12 accesses the screen transmission device 11 at the start of use, a computer screen is transmitted from the screen transmission device 11 to the screen display device 12. After this, a user input at the screen display device 12 is transmitted to the screen transmission device 11 and a newly updated screen is transmitted to the screen display device 12. After using the device for a while, suppose the remaining amount of the battery of the screen display device 12 is below a specified value and the luminance of the display is lowered automatically or by the user. In that case, luminance information of the display is transmitted from the screen display device 12 to the screen transmission device 11. The screen transmission device 11 changes a color setting of the screen or the like according to the received luminance information so as to be easy to see even at the changed luminance, and generates and transmits a new screen.

Figure 6:
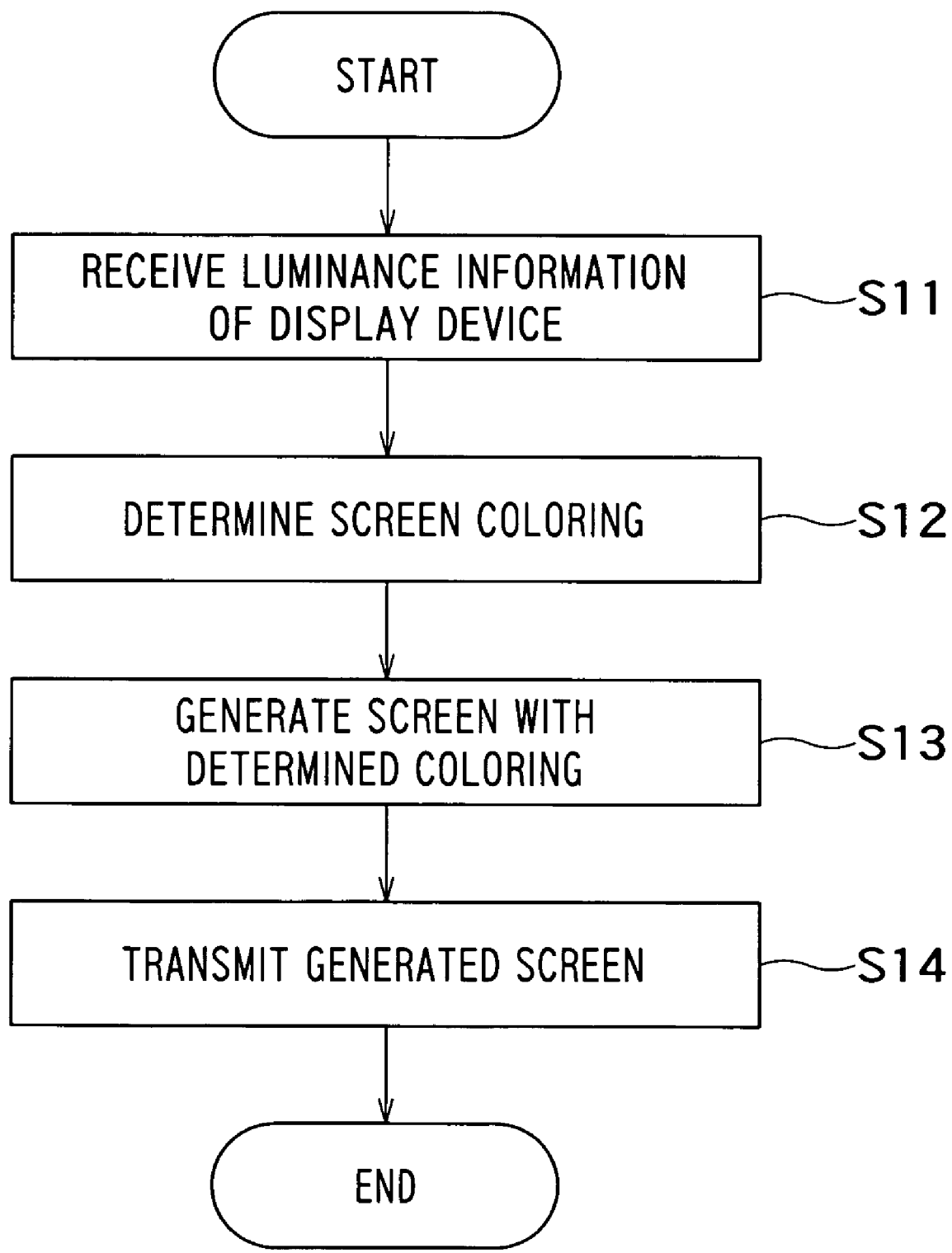
FIG. 6 is a flow chart showing processing when luminance information is received from the screen display device according to the first embodiment.

FIG. 6 is a flow chart showing the flow of processing carried out when luminance information is received from the screen display device 12 at the screen transmission device 11. The functions of the steps of S11 to S14 may be implemented by cause a computer to execute instructions to perform the steps of S11 to S14. And, a computer program including the instructions may be stored in a computer readable medium. When the screen transmission device 11 receives luminance information from screen display device 12 (S11), it determines the coloring of the screen to be generated based on the luminance shown in the received luminance information (S12). After that, the screen transmission device 11 generates a screen using the determined coloring (S13) and transmits the generated screen to the screen display device 12 (S14).

Using the screen display device and the screen transmission device described above, the user can perform remote operation while watching the computer screen of the screen transmission device from the screen display device at hand. When the remaining amount of the battery of the screen display device decreases, the luminance of the display automatically decreases and power saving is set, and the image displayed on the screen display device becomes a screen with coloring which is easy to see even when the luminance of the display decreases, and therefore the conventional inconvenience caused by power saving is alleviated.

Second Embodiment

[Screen Display Device Informing CPU Speed or the Like]

Figure 7:
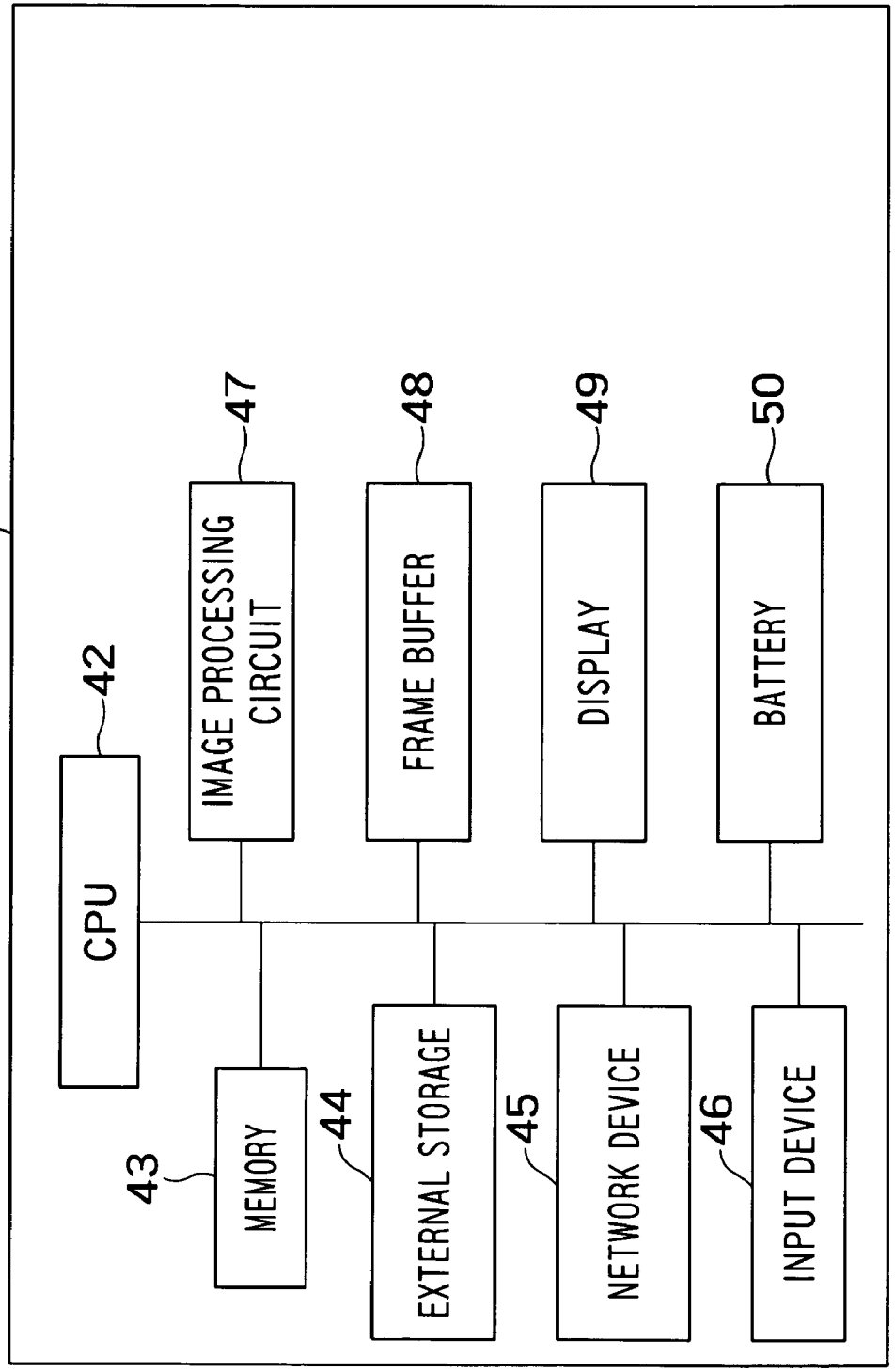
FIG. 7 illustrates an example of the block configuration of a screen display device according to a second embodiment.

FIG. 7 shows an example of the block configuration of a screen display device 41 of this embodiment. The figure shows a CPU (Central Processing Unit) 42, a memory 43, an external storage 44, a network device 45, an input device 46, an image processing circuit 47, a frame buffer 48, a display 49 and a battery 50.

The external storage 44 is a so-called hard disk drive or a CD-ROM (Compact Disc Read Only Memory) drive, DVD (Digital Versatile Disc) drive or the like and stores large-volume data and a program. When a program necessary to operate the device is stored in the external storage 44, the program is transferred to the memory 43.

The network device 45 is an Ethernet or wireless LAN device or the like, and transmits data to a network or receives data from the network.

The input device 46 is the device for the user to input data, and a mouse and a keyboard or the like correspond to this.

The memory 43 is a so-called RAM (Random Access Memory) or ROM (Read Only Memory). This stores a program and data necessary to operate the device.

The CPU 42 controls other elements 43-50, and reads the program stored in the RAM or ROM and performs control by carrying out operation according to the program.

The image processing circuit 47 is dedicated to processing to expand compressed image data.

The frame buffer 48 is the place to store image data to be displayed on the display 49.

The display 49 actually displays the image stored in the frame buffer 48.

This embodiment uses the image processing circuit 47, but it is also possible to adopt a mode in which all image processing is performed by the CPU 42 without using any image processing circuit.

The operation of the screen display device 41 when screen data is received from the screen transmission device will be explained. When the screen display device 41 receives screen data at the network device 45, it stores the received data in the memory 43. The screen display device 41 analyzes the received screen data and integrates a plurality of pieces of received data if necessary and thereby constructs a set of image data. The set of the image data when not compressed is written at an appropriate position of the frame buffer 48. When the image data is compressed, the screen display device 41 transfers data to the image processing circuit 47 and the image processing circuit 47 expands the data. The screen display device 41 writes the expanded data at an appropriate position of the frame buffer. The image data which has been newly written is sent to the display 49 and displayed. Through the above described processing, the screen data from the screen transmission device is displayed on the display 49.

The operation related to power saving of the screen display device 41 will be explained. As the power saving method, a method of decreasing the operating frequency of the CPU 42 may be considered first. By reducing the operating frequency, power consumed is reduced. Alternatively, a method of reducing the operating frequency of the image processing circuit 47 may also be considered. A further possible method is a method of constructing an image processing circuit with a configurable device and changing the circuit configuration to an image decoder circuit which requires only a small-scale circuit during power saving. As the timing of changing the operating frequency and changing the circuit configuration, for example, the user may be allowed to set the operating mode to determine these set values or it is also possible to monitor the remaining amount of the battery and change the configuration according to the remaining amount of the battery. Information indicating the change of the operating frequency and change of the configuration of the image processing circuit are transmitted to the screen transmission device as operating condition information.

Next, the screen transmission device of this embodiment will be explained. Because the block configuration example of the screen transmission device is the same as that in FIG. 3 of the first embodiment except the relationship between the blocks, and therefore drawings will be omitted and only different parts will be explained.

The operating condition information receiver receives the setting information on the operating frequencies of the CPU and image processing circuit in the above described screen display device and the configuration information of the image processing circuit. The operating condition information receiver informs the received information to the screen data acquirer and the screen data transmitter. The screen data acquirer and the screen data transmitter perform processing corresponding to the operating condition of the screen display device. For example, when the operating frequency is set low, the screen acquisition frequency by the transmission screen data acquirer is lowered to a frame rate at which processing is possible at the operating frequency. Alternatively, when the configuration of the image processing circuit is changed, the screen data transmitter is adapted to perform compression in an image compression format which allows the screen data to be decoded even after the change.

Figure 8:
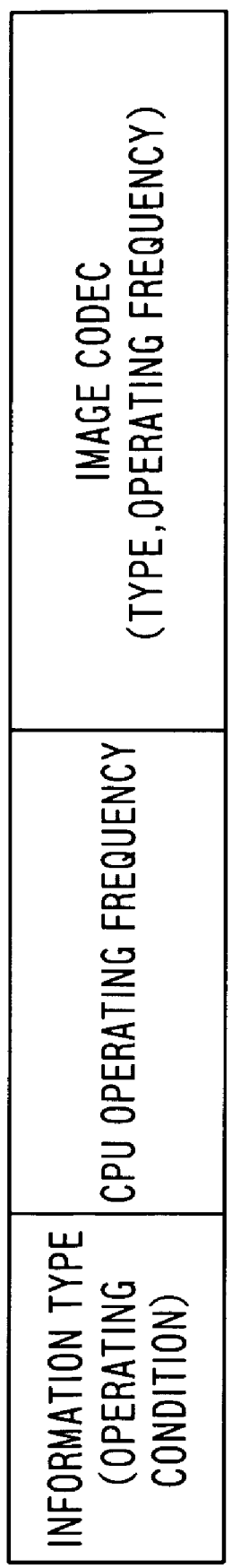
FIG. 8 illustrates an example of a frame format of operating condition information according to the second embodiment.

An example of the frame format of the operating condition information which is transmitted from the screen display device to the screen transmission device is shown in FIG. 8. Following the information type indicating the frame that describes the operating condition, the operating frequency of the CPU, the type of image CODEC and the operating frequency are described. As the operating frequency, for example, a specific number of clocks, for example, 400 MHz may be described or discrete levels, for example, level 1, level 2 and level 3 in the case of three stages may be provided and the current operating frequency level may be described.

As described above, even when a change occurs due to power saving at the screen display device, it is possible to perform a screen transfer that matches the changed configuration.

Third Embodiment

[Transmitting Side Instructing Luminance of Display]

Figure 9:
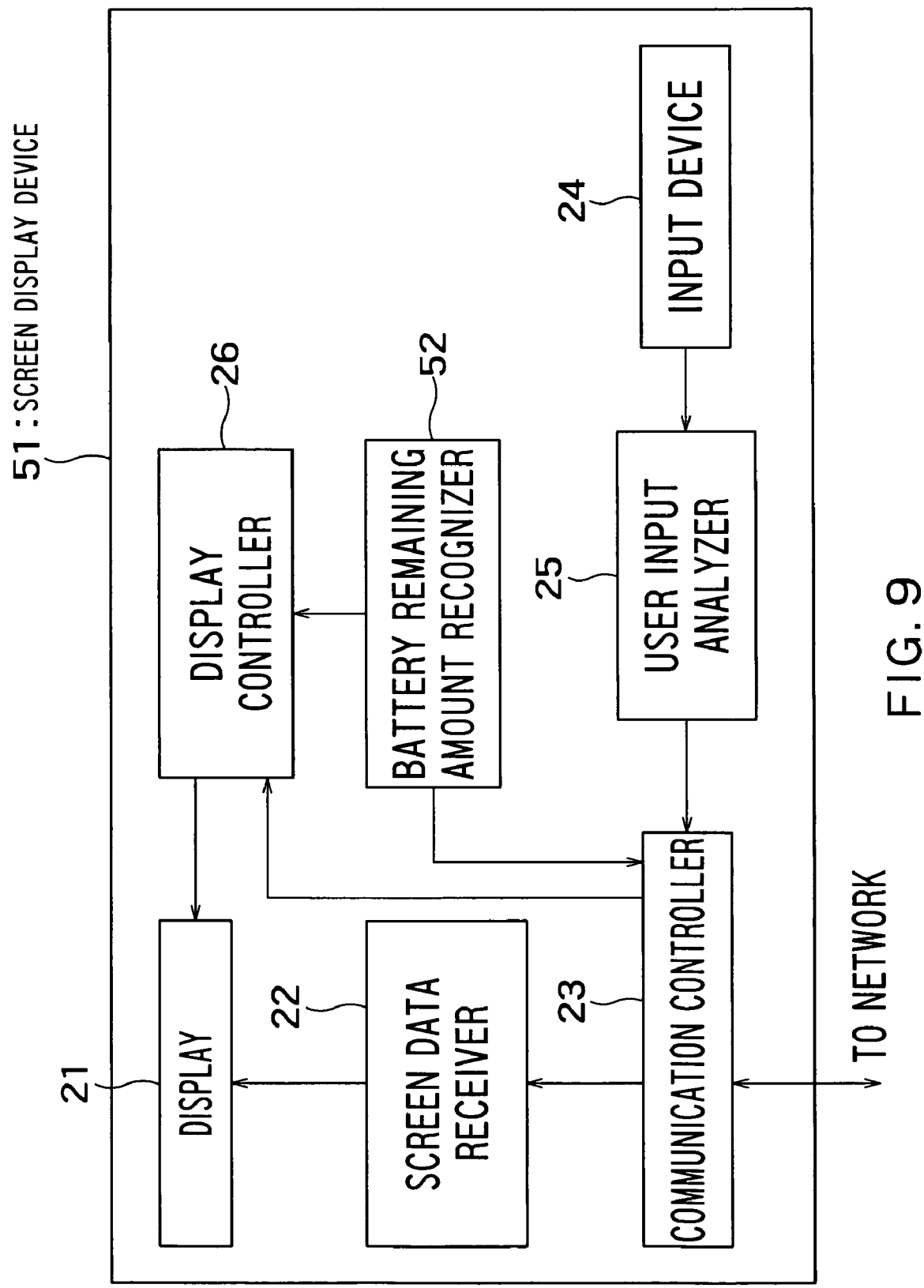
FIG. 9 illustrates an example of the block configuration of a screen display device according to a third embodiment.

FIG. 9 shows an example of the block configuration of a screen display device 51 according to a third embodiment. It is different from FIG. 2 in that a battery remaining amount recognizer 52 is added. In the figure, the same elements as those in FIG. 2 are assigned the same reference numerals and overlapping explanations will be omitted. Hereinafter, explanations will be focused on only the differences from FIG. 2.

A display controller 26 controls the luminance of a display 21. As a method of controlling the luminance, any method that matches the type of the display may be used. For example, when the display is a liquid crystal display, the luminance of the backlight is controlled. When the elements of the display itself emit light as an organic EL display, the amount of light emission of the elements is controlled. As for control timing, timing is controlled based on the display luminance setting information from the screen transmission device.

The battery remaining amount recognizer 52 keeps track of the remaining amount of the battery of the screen display device 51. The remaining amount of the battery recognized is informed to a communication controller 23 as the battery remaining amount information so as to be transmitted to the screen transmission device and further to a display controller 26. The remaining amount of the battery may be informed periodically or when the remaining amount of the battery falls to or below a certain level. Alternatively, the battery remaining amount level may be divided into a plurality of stages and whenever the battery remaining amount level changes, this may be informed.

Figure 10:
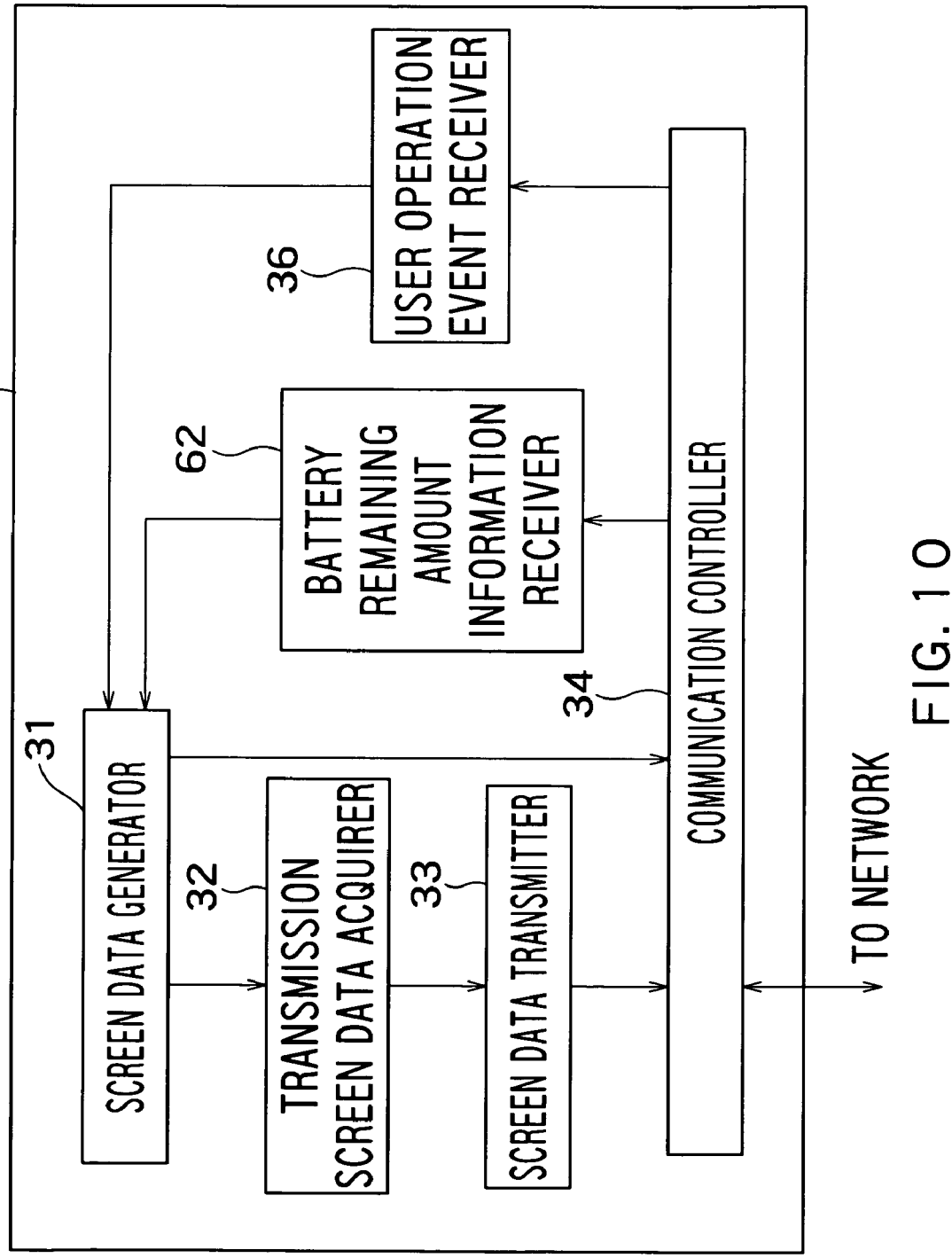
FIG. 10 illustrates an example of the block configuration of a screen transmission device according to the third embodiment.

FIG. 10 shows an example of the block configuration of a screen transmission device 61 according to the third embodiment. It is different from FIG. 3 in that a battery remaining amount information receiver 62 is added. In the figure, the same elements as those in FIG. 3 are assigned the same reference numerals and overlapping explanations will be omitted. Hereinafter, explanations will be focused on only the differences from FIG. 3.

The battery remaining amount information receiver 62 receives battery remaining amount information from the screen display device. The battery remaining amount information received is informed to a screen data generator 31.

Upon receiving the battery remaining amount information of the screen display device from the battery remaining amount information receiver 62, the screen data generator 31 changes the screen to be generated according to the level of the battery remaining amount. As the method of changing the screen, various ones may be considered. First, a method of changing a screen, that is, a background image of the desktop to an image in a single color may be considered. Using a single color reduces the image data size after compression, reduces the amount of data received by the screen display device, and can thereby reduce electric power. Many icons may be arranged on the desktop, but pictures of the icons may also be changed to pictures of boxes in a single color. Furthermore, assuming that the luminance of the display is changed by the screen display device, there may also another method of changing colors to be used. As a further specific example of the color change, it is possible to consider a method of changing over to such coloring that the difference in contrast of the color of the window and the color of characters which are displayed thereon increases so that it is easily visible to the user even when the luminance of the display decreases. Moreover, coloring may be changed step by step according to the battery remaining amount. First, the difference in contrast may be gradually widened using colors as close as possible to the original coloring and finally coloring may be adopted which produces a difference with the most striking contrast irrespective of the original colors such as black with a white background, and vice versa. When coloring is changed, the screen data generator 31 generates display luminance setting information and sends it to the communication controller 34 in order to inform the screen display device that it is possible to change the luminance of the display. The screen data generator 31 includes luminance determiner.

The display luminance setting information which is transmitted from the screen transmission device 61 to the screen display device will be explained. The display luminance setting information is the information indicating to what extent the luminance of the display can be changed when the coloring of the image to be transmitted to the screen display device is changed. For example, when a case where 3-stage control is performed as the luminance level is assumed, three stages of changes to coloring; "no change", "coloring with a contrast ratio improved by a medium degree" and "coloring with a contrast ratio improved to the limit" are provided. The screen transmission device 61 changes over to any one of three coloring types according to the remaining amount of the battery of the screen display device and transmits the luminance level which corresponds to the changed coloring to the screen display device as the display luminance setting information. The screen display device changes the luminance of the display based on the received display luminance setting information. Furthermore, as other display luminance setting information, information for controlling luminance according to some portion of the screen may also be considered. When a display which can change the luminance for each area of the display (for example, display device including a plurality of backlights, element light emission type display device) is used as the display of the screen display device, the luminance of an area which should be made brighter is increased and the luminance of the rest of the area is decreased according to the received display luminance setting information. For example, as the method of determining luminance for each area in the screen, it is possible to consider a method of setting high luminance for an area in which a focus window is displayed (backlight corresponding to the area in the case of a split backlight type display device, and so on) and setting low luminance for other areas. Alternatively, it is also possible to consider a method of setting high luminance for an area around the mouse pointer or the cursor for inputting characters or setting high luminance for an area where a screen is frequently updated or the like.

FIG. 11 shows an example of the frame format of the battery remaining amount information to be transmitted from the screen display device to the screen transmission device. The level of the battery remaining amount is described following the information type indicating the battery remaining amount information. As the level of the battery remaining amount, a method of using numerical values in the unit of a specific battery capacity such as Ah (ampere-hour) may also be considered, or simply a preset discrete remaining amount level (e.g., level 1, level 2 or the like) may also be used. Alternatively, expressions like a rate relative to a full charged condition such as 80%, 40% and ½, ⅓ or the like may also be used.

FIG. 12 shows an example of the frame format of the display luminance setting information to be transmitted from the screen transmission device to the screen display device. Following the information type which indicates the luminance setting instruction information, a luminance level to be set by the display device is described. As the luminance level, values of level 1, level 2 and level 3 may be used in accordance with the above described three stages or the luminance level may be indicated with numerical values according to the specific unit of luminance such as cd/m2. Following the luminance level, information on the position in the screen at which a luminance level (setting position information) is set is described. This setting position information may be omitted when the luminance of the whole display is always changed. When the luminance of only part of the above described display is changed, position information of the part to be changed is transmitted. As a specific example of the position information, the area where luminance is changed may be assumed as a rectangle and coordinates thereof may be described or a bit map indicating the position in the display where luminance is to be changed may be used.

Figure 13:
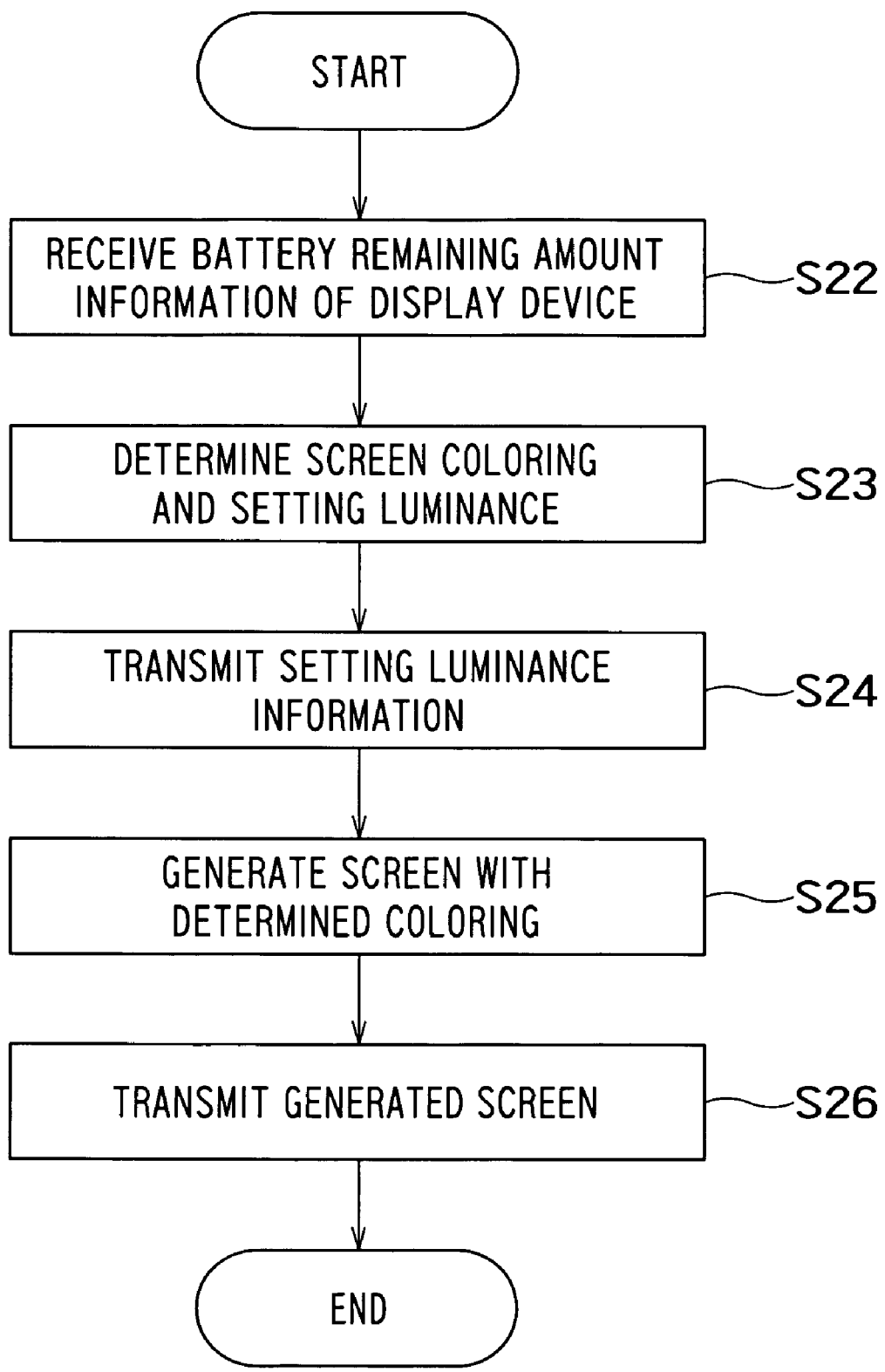
FIG. 13 is a flow chart illustrating a flow of processing carried out by the screen transmission device when the battery remaining amount information is received from the screen display device of the third embodiment.

FIG. 13 is a flow chart showing the flow of processing carried out by the screen transmission device when battery remaining amount information is received from the screen display device. The functions of the steps of S22 to S26 may be implemented by cause a computer to execute instructions to perform the steps of S22 to S26. And, a computer program including the instructions may be stored in a computer readable medium. Upon receiving battery remaining amount information from the screen display device (S22), the screen transmission device determines the coloring of the screen and the luminance of the display according to the coloring based on the received battery remaining amount (S23). The determined luminance is transmitted to the screen display device as the display luminance setting information (S24). In the case of the element light emission type display device, S23 and S24 may be omitted. After that, the screen transmission device generates a screen using the determined coloring (S25) and transmits the generated screen to the screen display device (S26).

As described above, when the remaining amount of the battery of the screen display device decreases, it is possible to reduce the amount of received data of the screen display device and reduce the amount of power consumption of the screen display device by simplifying the display contents of the screen as much as possible. Moreover, by not only automatically lowering the luminance of the display but also generating a screen using easy-to-see coloring even when the luminance is low, it is possible to reduce power consumption while suppressing deterioration of usability.

Fourth Embodiment

[Screen Transmitting Side Indicating CPU Speed or the Like of Screen Display Device]

The screen display device of this embodiment will be explained. Because the block configuration diagram of the screen display device is the same as that in FIG. 7 of the second embodiment, explanations will be focused on processing which is different from that of the second embodiment.

According to this embodiment, the screen display device monitors the remaining amount of the battery and transmits battery remaining amount information to the screen transmission device. Furthermore, the screen display device receives operation setting information from the screen transmission device. The operation setting information refers to an operating frequency of the CPU to be set, operating frequency of the image processing circuit and configuration information on the image processing circuit. The screen display device changes the setting based on the received operation setting information. The number of pieces of information included in the operation setting information is not limited to one but a plurality of pieces of information, for example, information for changing both operating frequencies of the CPU and the image processing circuit may be included.

Next, the screen transmission device of this embodiment will be explained. Because the block configuration example of the screen transmission device is the same as that in FIG. 10 of the third embodiment except the relationship between the blocks, only parts different from the third embodiment will be explained using FIG. 10.

The battery remaining amount information receiver 62 informs the battery remaining amount information received from the screen display device to the transmission screen data acquirer 32 and screen data transmitter 33.

The transmission screen data acquirer 32 and the screen data transmitter 33 change the frame rate and the compression format according to the informed battery remaining amount, generates operation setting information to be set by the screen display device according to the change and transmits it to the screen display device.

FIG. 14 shows an example of the frame format of the operation setting information. Following the information type which indicates the frame describing the operation setting information, the operating frequency of the CPU, type of image CODEC and operating frequency are described. As the operating frequency, a method of describing a specific number of clocks, for example, 400 MHz may be used or discrete levels such as level 1, level 2 and level 3 in the case of three stages may be provided and the current operating frequency level may be described. Furthermore, FIG. 14 describes the operating frequency of the CPU, type of image CODEC and operating frequency, but only items to be changed may be described.

As described above, when the remaining amount of the battery of the screen display device decreases, efficient power saving can be realized by changing the method of transmitting screen data and setting the screen display device to an operating condition which matches the screen data to be transmitted.

Fifth Embodiment

[Selecting Transmission Event]

Figure 15:
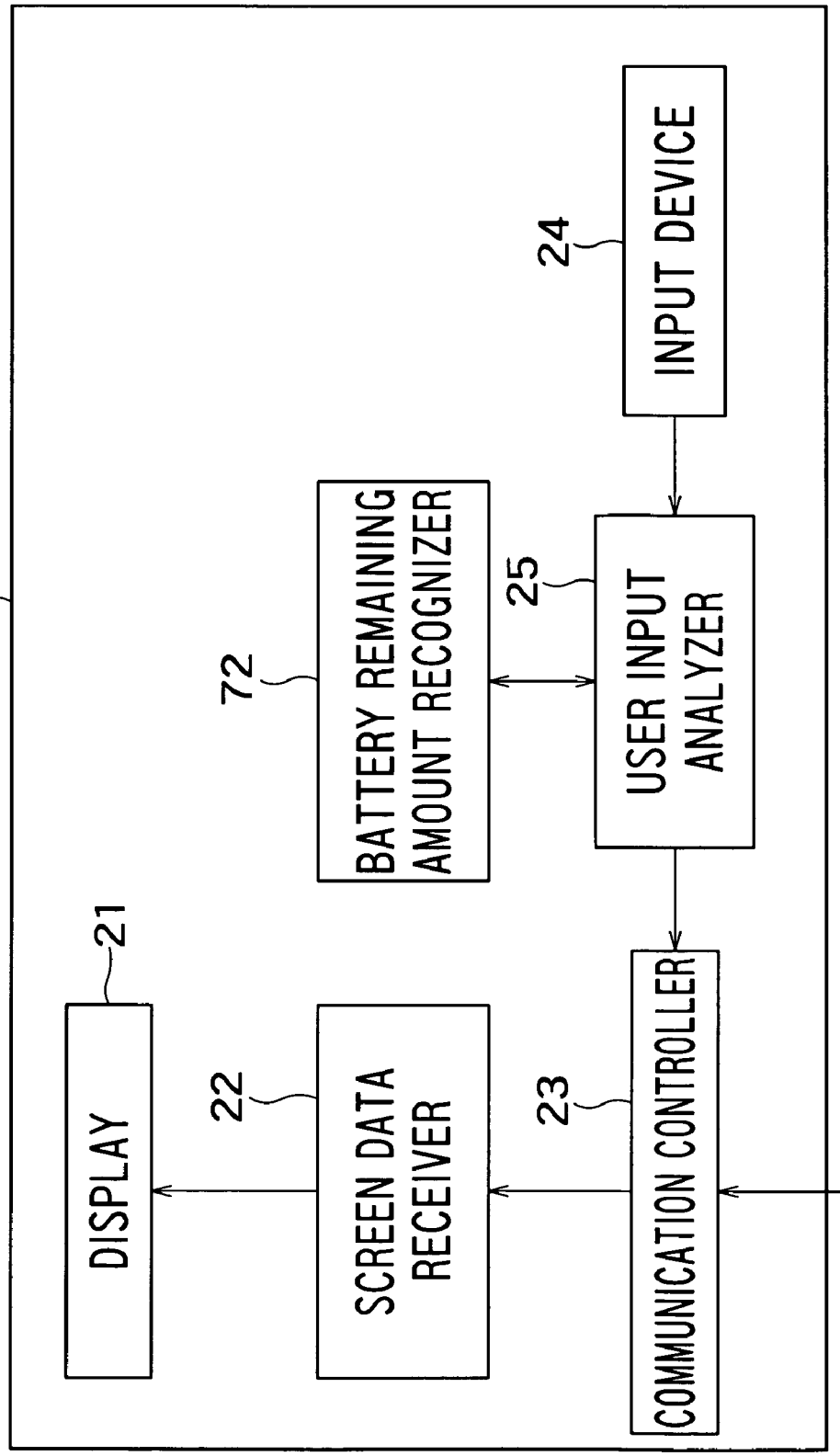
FIG. 15 illustrates an example of the block configuration of a screen display device according to a fifth embodiment.

FIG. 15 shows an example of the block configuration of a screen display device according to this embodiment. In the figure, the same elements as those in FIG. 2 are assigned the same reference numerals and overlapping explanation will be omitted. Hereinafter, explanations will be focused on blocks different from those in FIG. 2.

A battery remaining amount recognizer 72 keeps track of the remaining amount of the battery of the screen display device. The battery remaining amount recognizer 72 informs the recognized remaining amount of the battery to a user input analyzer 25. The remaining amount of the battery may be informed periodically or only when there is a request from a user input analyzer 25. Alternatively, the battery remaining amount level may be divided into a plurality of stages and whenever the battery remaining amount level changes, this may be informed.

Instead of sending all of the events which have been inputted from an input device 24 and converted to the screen transmission device, the user input analyzer 25 controls a transmission amount according to the battery remaining amount information obtained from the battery remaining amount recognizer 72. For example, it is possible to consider a method whereby when the remaining amount of the battery is equal to or above a certain level and it is possible to judge that there is a sufficient remaining amount, all events are sent, but when the remaining amount of the battery falls to or below the certain level, pointer movement events are not always sent but only when a button Up or Down event occurs, and not sent otherwise. While no cursor movement event is being sent, if the screen display device draws a cursor independently by itself instead of make the screen transmission device draw it, there will be no hindrance to the operation of the user. As the method for the screen transmission device to draw a cursor independently, a method using, for example, an OSD (On Screen Display) function of the display may be considered. Alternatively, instead of the method of not sending any pointer movement event except button Up/Down events, a method of reducing the frequency such as once every two times or once every three times may also be considered. Alternatively, the way of lowering the transmission frequency of events may be changed according to the level of the remaining amount of the battery. Furthermore, transmission of an event is judged based on the remaining amount of the battery in this embodiment, but it is also possible to allow the user to set in what mode the device should be operated.

The screen transmission device of this embodiment is the same as that of the first embodiment, and therefore explanations thereof will be omitted.

Using the above described screen display device and screen transmission device, the user can operate the screen transmission device while watching the computer screen of the screen transmission device at the screen display device at hand and decrease the amount of transmission of pointer movement events when the remaining amount of the battery of the screen display device is running short, and thereby decrease the amount of data transmitted from the screen display device to the screen transmission device and further reduce screen update processing associated with pointer movements and thereby decrease power consumption of the screen display device.

Sixth Embodiment

[Changing Cache Size]

Figure 16:
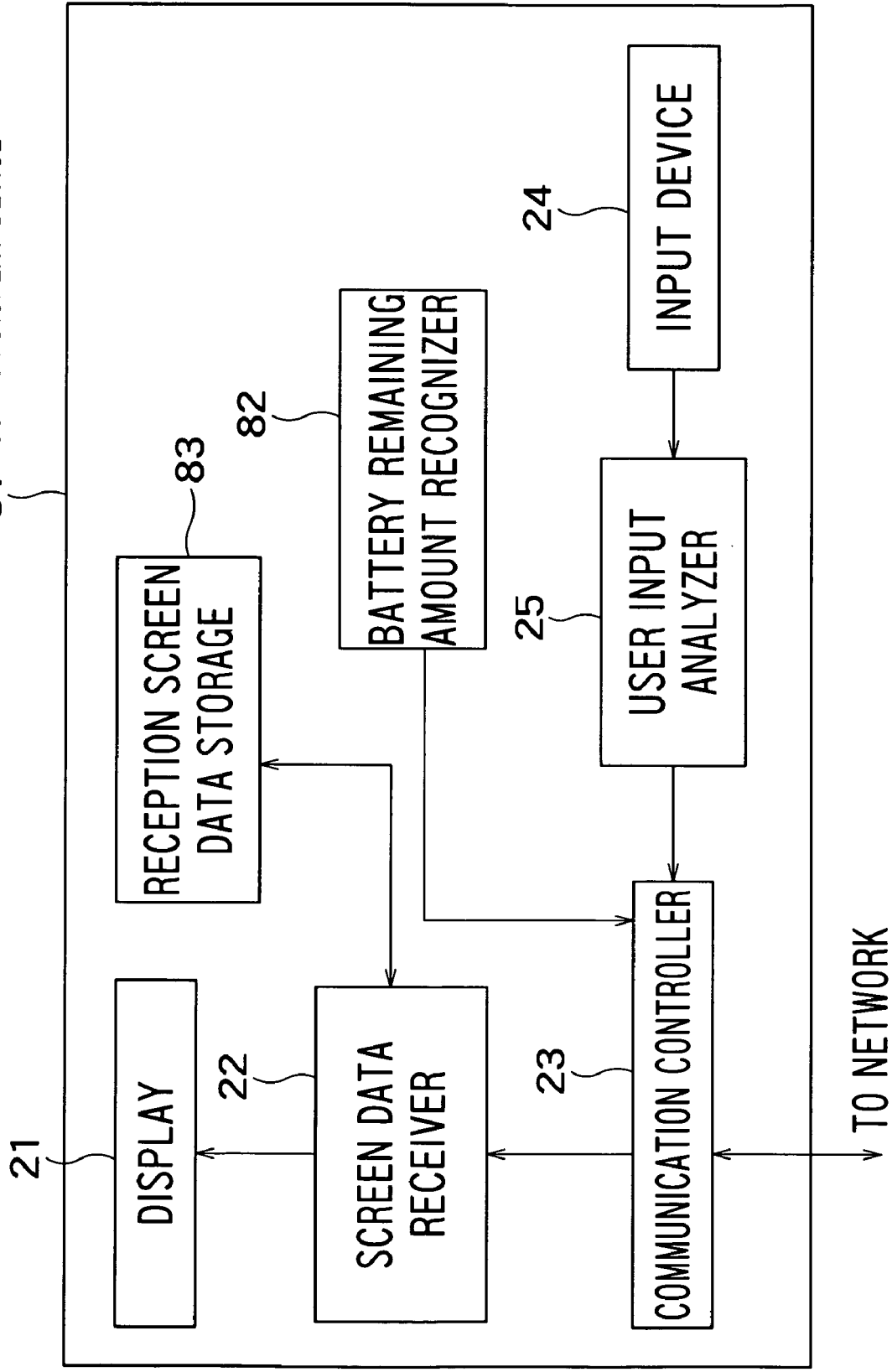
FIG. 16 illustrates an example of the block configuration of a screen display device according to a sixth embodiment.

FIG. 16 shows an example of the block configuration of a screen display device 81 according to a sixth embodiment. In the figure, the same elements as those in FIG. 2 are assigned the same reference numerals and overlapping explanations will be omitted. Hereinafter, explanations will be focused on only the differences from FIG. 2.

A battery remaining amount recognizer 82 keeps track of the remaining amount of the battery of the screen display device 81. The battery remaining amount recognizer 82 transmits the recognized battery remaining amount to the screen transmission device through a communication controller 23. As a timing of informing, the remaining amount of the battery may be informed periodically or only when there is a request from a user input analyzer 25. Alternatively, the battery remaining amount level may be divided into a plurality of stages and whenever the battery remaining amount level changes, this may be informed.

A reception screen data storage 83 stores received screen data in correspondence with an index. The screen data and the index to be stored are sent from a screen data receiver 22. Furthermore, when there is a request for acquisition of screen data which corresponds to an index from the screen data receiver 22, the reception screen data storage 83 searches through the stored screen data and sends the search result to the screen data receiver 22.

The screen data receiver 22 may receive the following three kinds of screen data from the screen transmission device.

Figure 17:
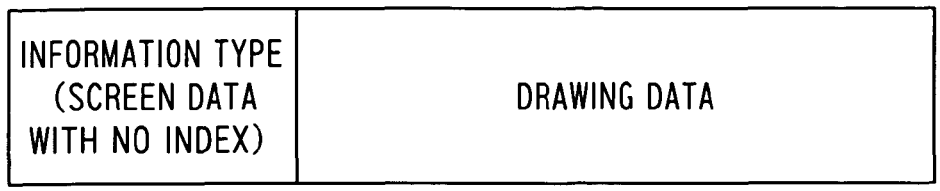
FIG. 17 illustrates an example of a frame format of screen data with no index according to the sixth embodiment.
Figure 18:
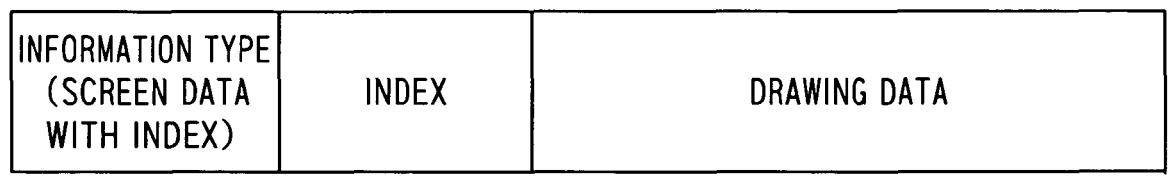
FIG. 18 illustrates an example of a frame format of screen data with an index according to the sixth embodiment.
Figure 19:
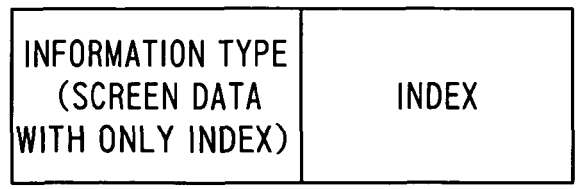
FIG. 19 illustrates an example of a frame format of screen data with only an index according to the sixth embodiment.

(1) Screen data which includes drawing data but no index
(2) Screen data which includes both drawing data and index
(3) Screen data which includes index but no drawing data In case (1), the screen data receiver 22 writes drawing data into a frame buffer according to an updated position. In case (2), the screen data receiver 22 writes drawing data into the frame buffer and sends the drawing data and index to the reception screen data storage 83 and stores them. In case (3), the screen data receiver 22 sends the index to the reception screen data storage 83 and acquires the drawing data stored in the reception screen data storage 83. The screen data receiver 22 writes the acquired drawing data into the frame buffer. FIG. 17 to FIG. 19 show examples of the frame formats (1) to (3) respectively.

Figure 20:
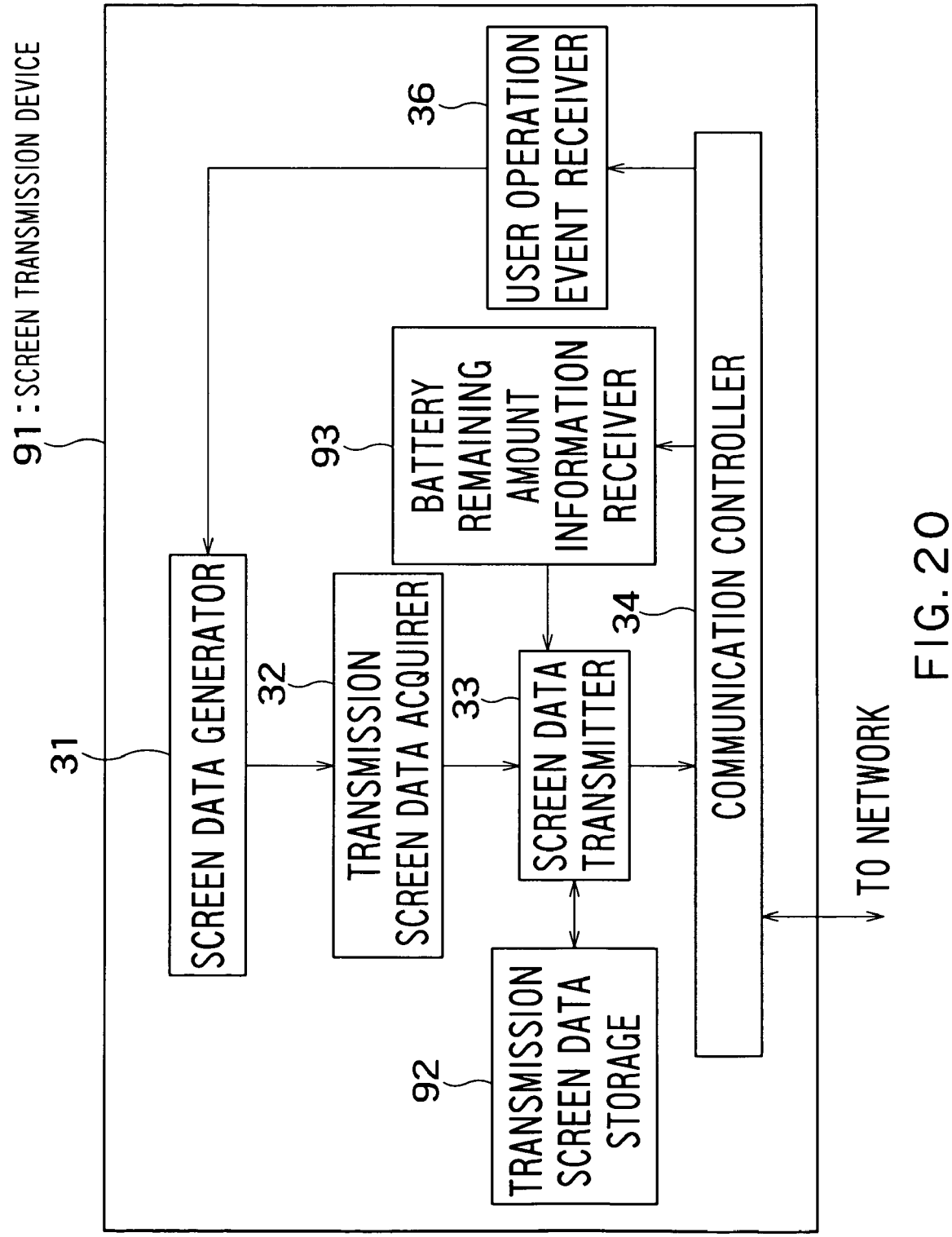
FIG. 20 illustrates an example of the block configuration of a screen transmission device according to the sixth embodiment.

FIG. 20 shows an example of the block configuration of a screen transmission device 91 of the sixth embodiment. It is different from FIG. 3 in that a transmission screen data storage 92 and a battery remaining amount information receiver 93 are added and that the operating condition information receiver 35 has been removed. In the figure, the same elements as those in FIG. 3 are assigned the same reference numerals and overlapping explanations will be omitted. Hereinafter, explanations will be focused on only the differences from FIG. 3.

The battery remaining amount information receiver 93 informs the battery remaining amount information of the screen display device received from the screen display device to a screen data transmitter 33.

The transmission screen data storage 92 stores drawing data which was transmitted, in correspondence with an index. The drawing data to be stored is received from the screen data transmitter 33 and when the drawing data is received, an unused index is assigned to the drawing data. The assigned index is informed to the screen data transmitter 33. Furthermore, when there is a search request for the same drawing data as drawing data from the screen data transmitter 33, the transmission screen data storage 92 finds matching between the stored drawing data and the drawing data and if there is any identical part, it sends the index associated with the drawing data to the screen data transmitter 33. As the matching method, an index may be sent only when the two completely match or when an image that completely includes the received image is found, the matching position may be sent together with the index of this image.

On receiving the screen data to be transmitted to the screen display device from a transmission screen data acquirer 32, the screen data transmitter 33 requests the transmission screen data storage 92 to conduct a search to examine whether or not the received screen data is the drawing data which has already been transmitted. When a hit is found in the search, only the index is transmitted to the screen display device as the search result because the screen data has already been transmitted. However, when part of the drawing data as the search result matches, information indicating which part matches is also transmitted together. When no hit is found in the search, it is judged whether or not the drawing data should be stored in the transmission screen data storage 92 and if the drawing data should be stored, the drawing data is sent to the transmission screen data storage 92 and the index associated with the sent drawing data is received from the transmission screen data storage 92. When the drawing data is newly stored in the transmission screen data storage 92, the drawing data and index are sent to the communication controller 34 and transmitted to the screen display device, and when the drawing data is not stored, only the drawing data is sent to the communication controller 34 and transmitted to the screen display device.

As the method of judging whether or not unsaved drawing data is newly saved, it is possible to consider a method whereby a maximum number of pieces of data saved is determined, and the drawing data is saved when the number of pieces of the saved drawing data is smaller than the maximum number and not saved when the number of pieces of the saved drawing data reaches the maximum number. The maximum number of pieces of data saved is determined based on the remaining amount of the battery of the screen display device received from the battery remaining amount information receiver 93. When there is a sufficient remaining amount of the battery, the maximum number is decreased and the maximum number is increased as the remaining amount of the battery decreases.

As described above, when there is a sufficient remaining amount of the battery of the screen display device, data is immediately transmitted without the screen transmission device performing search processing on the image data or the like, and the screen display device displays a screen with a small delay. When the remaining amount of the battery of the screen display device decreases, the amount of the stored drawing data increases, only the indexes to be transmitted/received increases, and therefore it is possible to decrease the amount of data to be received on the screen display device side and further reduce the amount of processing on the received image data and thereby reduce power consumption.

Seventh Embodiment

[Changing Transmission Rate Depending on Place]

Figure 21:
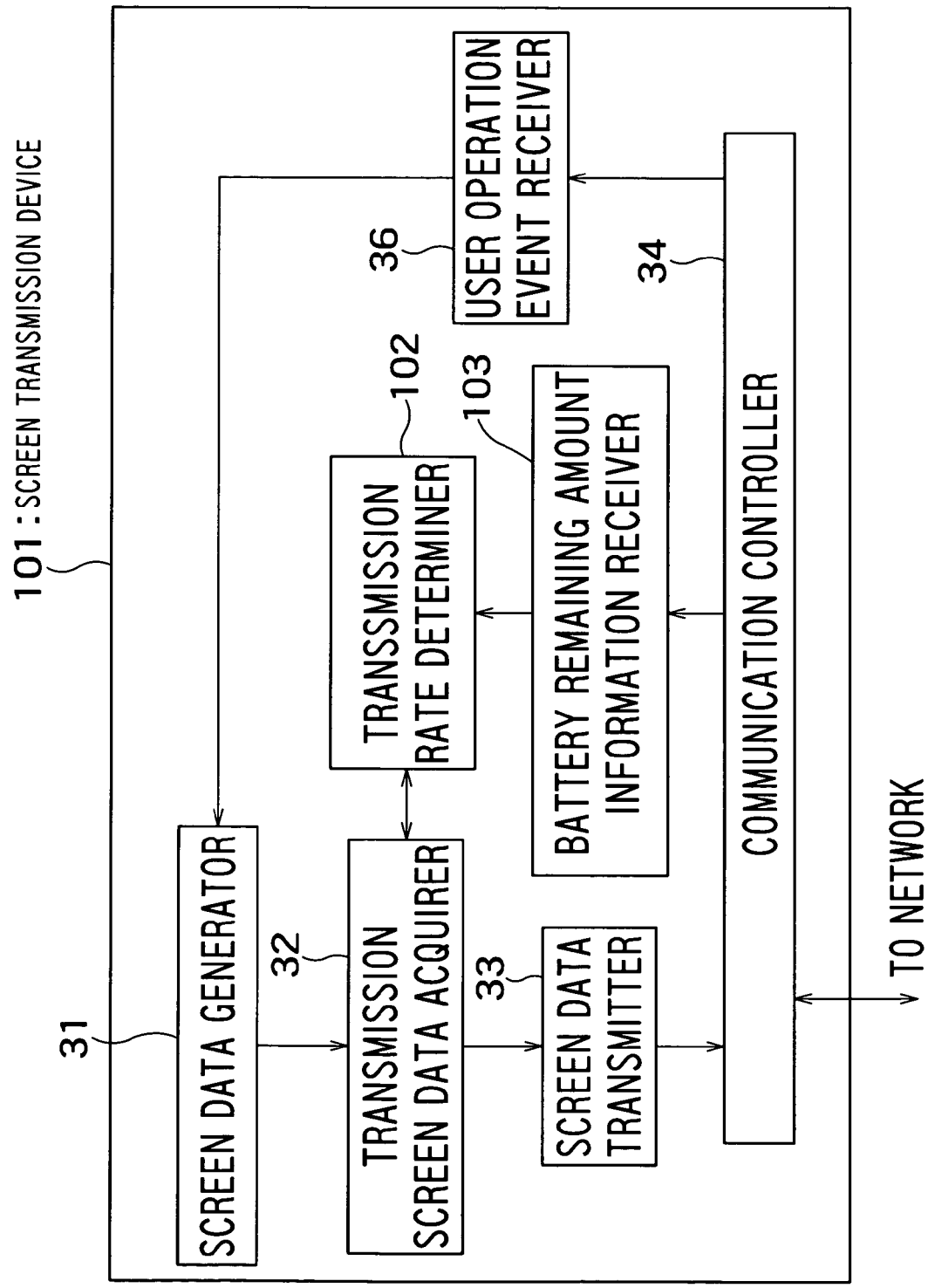
FIG. 21 illustrates an example of the block configuration of a screen transmission device according to a seventh embodiment.

FIG. 21 shows an example of the block configuration of a screen transmission device 101 according to a seventh embodiment. It is different from FIG. 3 in that a transmission rate determiner 102 and a battery remaining amount information receiver 103 are added. In the figure, the same elements as those in FIG. 3 are assigned the same reference numerals and overlapping explanations will be omitted. Hereinafter, explanations will be focused on only the differences from FIG. 3.

The battery remaining amount information receiver 103 informs the battery remaining amount information of the screen display device received from the screen display device to the transmission rate determiner 102.

The transmission rate determiner 102 determines the transmission rate of the screen from the attribute of the screen to be transmitted and the battery remaining amount information of the screen display device. The method of determining a transmission rate is not particularly limited, but for example, a method of storing a table of correspondence between a screen attribute and transmission rate according to the remaining amount of the battery can be considered. FIG. 22 shows an example of the table of correspondence between a screen attribute and transmission rate according to the remaining amount of the battery. The table expresses the transmission rate in three stages of "high", "medium" and "low." For example, a screen attribute "pointer" means a screen update with a pointer image and indicates that transmission is carried out at a high rate when the remaining amount of the battery of the screen display device is 30% or more and a medium rate when it is less than 30%. In the same way, in the case of a screen update in a video window, it indicates that transmission is carried out at a high rate when the battery remaining amount is 80% or more, a medium rate when it is 60% or more and a low rate when it is less than 60%. When there is a query of the transmission rate for each screen attribute from the transmission screen data acquirer 32, the transmission rate determiner 102 examines the transmission rate based on the table and replies.

The transmission screen data acquirer 32 acquires an update screen and sends the data to be transmitted to the screen display device to the screen data transmitter 33. At this time, it changes the transmission rate according to the attribute of the update screen. There can be various methods of acquiring attributes of the screen, but as an example of this, it is possible to hook drawing-related events such as movement of a pointer to recognize the "pointer" attribute and recognize attributes such as "focus window" and "video window" from the window attribute information such as on/off of the focus and position and an application name. The transmission screen data acquirer 32 inquires of the transmission rate determiner 102 about the transmission rate for the attribute of the update screen. When the transmission rate is "high", the transmission screen data acquirer 32 immediately sends the acquired screen to the screen data transmitter 33. When the transmission rate is "medium" or "low", it reserves the acquired screen for a predetermined time corresponding thereto and then sends it to the screen data transmitter 33. When a screen is newly updated while being reserved, it reflects the update and sends it to the screen data transmitter 33.

As described above, it is possible to extend the operating time of a battery without omitting a response to a user input by controlling a transmission rate according to an attribute of each part of the screen, such as transmitting a screen update which occurs as a result of a user input such as a pointer display and menu display at a high rate and reducing the transmission rate for display updates of a video playback window and unfocused windows.

What is claimed is:

1. A screen transmission device comprising:
an information receiver configured to receive luminance information indicating luminance of a backlight of a backlight type LCD (Liquid Crystal Display) device;
a coloring determiner configured to determine coloring of screen data to be displayed on the backlight type LCD device based on the luminance information such that a range from a minimum value to a maximum value of tone of pixels in the screen data is widened as the luminance indicated in the luminance information decreases;
a screen data generator configured to generate screen data to be displayed on the backlight type LCD device according to the coloring; and
a screen data transmitter configured to transmit the screen data to the backlight type LCD device.

2. A screen transmission device comprising:
an information receiver configured to receive battery information indicating a remaining amount of a battery of a screen display device;
a coloring determiner configured to determine coloring of screen data to be displayed on the screen display device based on the battery information and adopt a single color as coloring of an object image in the screen data;
a screen data generator configured to generate screen data to be displayed on the screen display device according to the coloring, and
a screen data transmitter configured to compress the screen data and transmit compressed screen data to the screen display device.

3. A screen generating method, comprising:
receiving luminance information indicating luminance of a backlight of a backlight type LCD (Liquid Crystal Display) device;
determining coloring of screen data to be displayed on the backlight type LCD device based on the luminance information such that a range from a minimum value to a maximum value of tone of pixels in the screen data is widened as the luminance indicated in the luminance information decreases;
generating screen data to be displayed on the backlight type LCD device according to the coloring; and
transmitting the screen data to the backlight type LCD device.

4. A screen transmission method comprising:
receiving battery information indicating a remaining amount of a battery of a screen display device;
determining coloring of screen data to be displayed on the screen display device based on the battery information and adopting a single color as coloring of an object image in the screen data;
generating screen data to be displayed on the screen display device according to the coloring; and
compressing the screen data and transmitting compressed screen data to the screen display device.

* * * * *